United States Patent [19]

Wheatley

[11] Patent Number: 4,556,931
[45] Date of Patent: Dec. 3, 1985

[54] LENS FOR FRONT END PANEL OF AUTOMOTIVE VEHICLE

[76] Inventor: D. Edward Wheatley, 4451 Ford Rd., Ann Arbor, Mich. 48105

[21] Appl. No.: 574,890

[22] Filed: Jan. 30, 1984

[51] Int. Cl.⁴ .............................................. B60Q 1/06
[52] U.S. Cl. .................................... 362/61; 362/267; 362/277
[58] Field of Search ...................... 362/61, 64, 65, 80, 362/83, 267, 277

[56] References Cited

U.S. PATENT DOCUMENTS 4,249,232 2/1981 Dick ................................ 362/267 X

OTHER PUBLICATIONS

J. C. Whitney Catalog No. 442D, copyright 1982, 1983, 1984, p. 105.
J. C. Whitney Catalog No. 410D, copyright 1981, p. 90.

*Primary Examiner*—Tony M. Argenbright
*Attorney, Agent, or Firm*—Charles W. Chandler

[57] ABSTRACT

A lens is disclosed for a recessed automotive headlamp. The lens is removably installed without drilling any holes, and mounts flush with vehicle front-end panel so as to appear to be part of the original vehicle.

6 Claims, 4 Drawing Figures

LENS FOR FRONT END PANEL OF AUTOMOTIVE VEHICLE

BACKGROUND OF THE INVENTION

This invention is related to a lens mounted on the headlamp bezel of a vehicle having recessed headlamps by means of a resilient molding mounted around the edge of the lens. A strip of hook and loop fastener is attached to the molding and mates with a complementary fastener attached to the headlight housing disposed between the bezel and the headlamps.

Many vehicles have headlamps recessed in the vehicle front end panel with a housing that fills the space between the headlamp and the front end panel. Such an installation frequently forms a pocket trapping snow during the winter, and creating increased aerodynamic drag thus reducing overall fuel economy. Some vehicle owners have mounted a lens in the bezel opening flush with the front end panel surface, however, such installations usually supply fastener means requiring holes drilled in the vehicle which is undesirable and requires special tools for removal and cleaning. Further, the lens is not fitted sufficiently in the bezel opening to prevent snow and the like from getting behind the lens.

SUMMARY OF THE INVENTION

The broad purpose of the present invention is provide a removable lens for the bezel of the front end panel of a vehicle having a recessed headlamp in which a resilient extruded molding is mounted around the edge of the lens. The molding has a generally T-shaped cross-section with the body of the "T" extending parallel to the housing wall. Hook and loop fastener means are disposed between the housing wall and the molding. The lens is easily inserted into the bezel opening in a flush position in which it appears to form an original part of the vehicle. It can be easily removed. The hook and fastener is adhesively attached to the vehicle without either disturbing any of the vehicle finish or drilling any holes.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
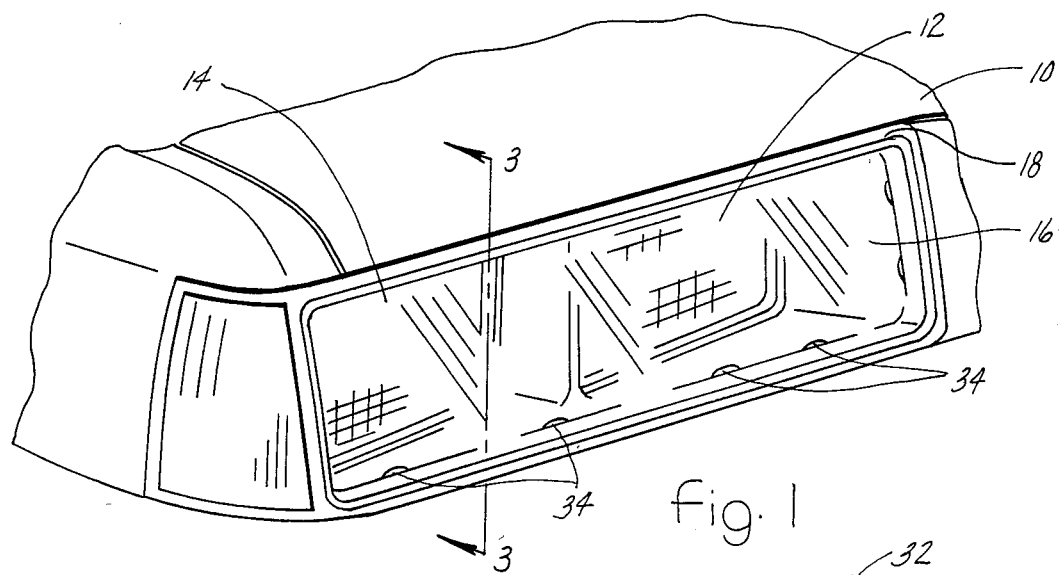
FIG. 1 is a perspective view illustrating a preferred lens mounted in the front end panel of a vehicle.
Figure 2:
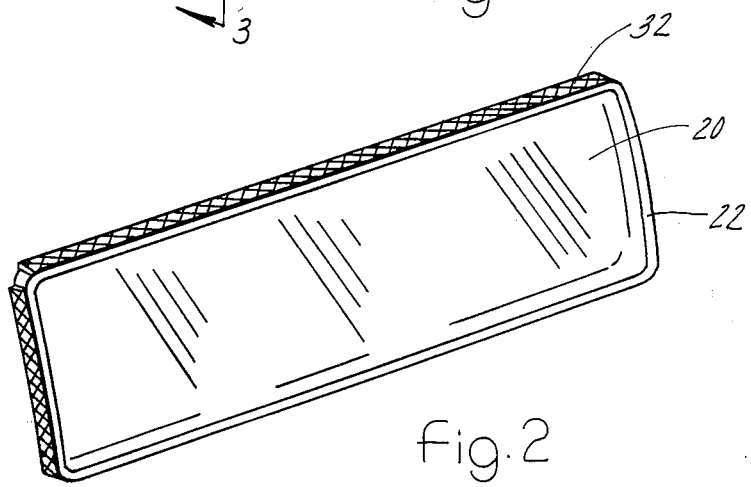
FIG. 2 is a view illustrating the lens removed from the front end panel.
Figure 3:
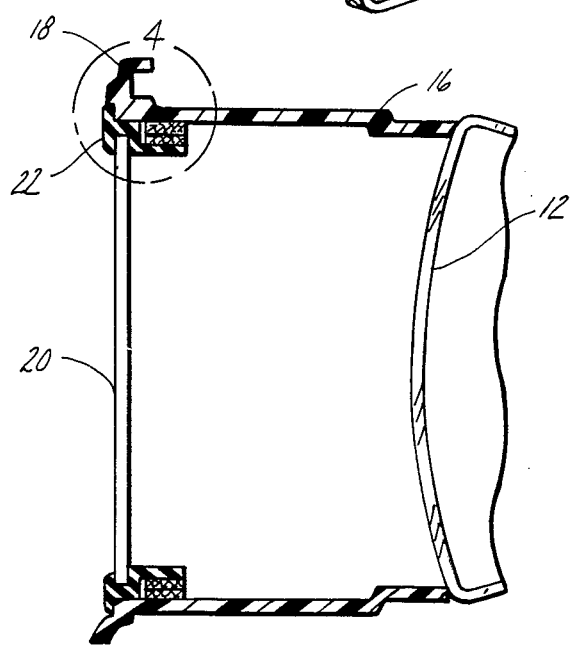
FIG. 3 is a view generally as seen along lines 3—3 of FIG. 1.

Referring to the drawing, FIG. 1 illustrates the front end panel 10 of an automotive vehicle having a pair of recessed headlamps 12 and 14. Filler housing 16 is disposed between the headlamps and an opening in the front end panel. Bezel 18 frames the panel opening, and can be an integral part of the filler housing.

Lens 20, preferrably formed of the clear acrylic plastic, is mounted in the opening defined by bezel 18. The lens can be of other appropriate colors if desired. The lens has a border corresponding to the opening in the bezel.

Figure 4:
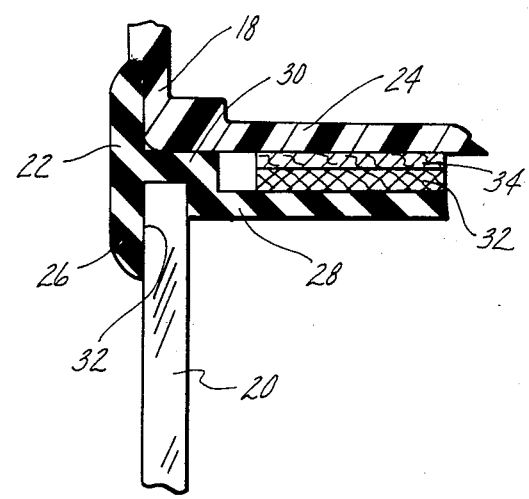
FIG. 4 is an enlarged view taken from FIG. 3 of a portion of the molding and lens.

Molding 22 is mounted around the lens edge and disposed between the lens and wall 24 of housing 16. Referring to FIG. 4, the cross-section of molding 22 is illustrated. The molding is preferably formed of an extruded rubber material having a generally T-shaped cross-section including a head 26 which extends from opposite sides of a body 28 disposed at right angles to the head. The body has a offset section 30 forming a channel 32 corresponding to the thickness of the lens edge so that it snugly captures the lens. The rubber moulding is glued to the lens edge. The width of the head is such that it overlaps the opening between the lens edge and the bezel. When the molding is mounted on the bezel, body 28 of the extrusion is parallel to wall 24.

An elongated strip of hook and loop fastener 32 such as Velcro or other commercially available fabric fastener means is attached to the body, as illustrated. As is well known, hook and loop fasteners are a product comprising mating sections of a material in which one section comprises a plurality of closely spaced hooks and the other section comprises a plurality of closely spaced loops. Several sections of mating hook and loop fastener 34 are mounted about the opening in the filler housing wall to releasably engage the molding when the lens is inserted in a flush position in the bezel opening. The molding provides a seal between the lens and the headlamp opening, creates an appearance as if it were an original part of the vehicle, comprises rust free parts and requires no holes or drilling. In addition it reduces the drag coefficient of the car and the acrylic sheet is much more resistant to breakage than an equivalent thickness of glass.

The lens assembly is preferrably mounted first by cleaning the headlights and the headlight area with a solvent and drying. Several hook and loop sections 34 are mounted on the four sides of the headlight lamp opening about a ¼ inch from the front edge. The lens with the molding and the mating sets of hook and loop fasteners is placed in the bottom of the lens opening and then pushed firmly into position to a flush position.

Having described my invention I claim:

1. In combination with a vehicle having a front-end panel with an opening, a headlamp recessed with respect to the front end panel and aligned with said opening;

filler housing means disposed in said opening to frame said headlamp, the filler housing means having a wall with first opening framing the headlamp and a second opening disposed adjacent to the front-end panel opening;

a lens having a border generally corresponding to the border of the second opening of the filler housing means, and being removably mounted in said second opening;

a resilient molding mounted about the edge of the lens, said molding comprising an extrusion of a resilient material having a generally T-shaped cross-section including a head extending in opposite directions from a body, the body having an offset portion forming with one side of the head a channel receiving the edge of the lens, the head having a width sufficient to overlap the seam between the lens and the filler housing means, the body of the molding being disposed adjacent the filler housing wall; and fastening means disposed between the body of the molding and the filler housing wall for releasably connecting the molding to said wall.

2. A combination is defined in claim 1, in which the fastening means comprises mating sections of a hook and loop fastener mounted between the filler housing wall and the molding.

3. A combination is defined in claim 2, in which the hook and loop type fastener is mounted in a continuous strip on the molding.

4. A combination is defined in claim 1, in which the lens is formed of plastic.

5. A combination as defined in claim 1, in which the filler housing means includes a bezel attached thereto about the filler housing second opening.

6. In combination with a vehicle having a front end panel with a panel opening, a headlamp including a headlamp lens recessed behind the front end panel and aligned with said panel opening;

housing means disposed in said panel opening, the housing means having a wall with an inner opening disposed adjacent the headlamp and a outer opening disposed adjacent the panel opening;

bezel means carried on the housing means about the outer opening;

a lens cover having a peripheral edge with a diameter less than the diameter of the outer opening of the housing, and being disposed within the outer opening;

a resilient extruded molding mounted about the peripheral edge of the lens cover, the molding having a body disposed between the peripheral edge of the lens cover and the wall of the housing adjacent the bezel;

the molding body having an inner edge disposed in a position between the lens cover and the headlamp and being spaced with respect to the housing;

the molding having a head extending in a first direction with respect to the body to overlap a portion of the bezel about the outer opening, the head extending in the opposite direction from the body to overlap the surface of the lens cover facing away from the headlamp; and releasable fastener means disposed between the inner edge of the molding body and the housing to connect the lens cover to the housing in a position hidden from a viewer located outside of the lens cover.

* * * * *